(12) United States Patent
Guo

(10) Patent No.: US 7,086,348 B2
(45) Date of Patent: Aug. 8, 2006

(54) MILKING PARLOR FOR THE FORWARD STRAIGHT LINE ANIMAL AMBULATION AND INDIVIDUAL PRESENTATION OF AN ANIMAL TO BE MILKED IN A MILKING STALL LOCATED INTERMEDIATE A HOLDING AREA AND A RELEASE AREA

(76) Inventor: Fangjiang Guo, 135 Simsbury Dr., Ithaca, NY (US) 14850

( * ) Notice: Subject to any disclaimer, the term of this patent is extended or adjusted under 35 U.S.C. 154(b) by 240 days.

(21) Appl. No.: 10/196,789

(22) Filed: Jul. 17, 2002

(65) Prior Publication Data

US 2004/0011294 A1    Jan. 22, 2004

(51) Int. Cl.
*A01J 3/00* (2006.01)
*A01J 5/00* (2006.01)

(52) U.S. Cl. .................. 119/14.02; 119/14.03
(58) Field of Classification Search ............ 119/14.02, 119/14.03, 14.04, 14.18, 14.53; 116/14.03
See application file for complete search history.

(56) References Cited

U.S. PATENT DOCUMENTS

| | | | |
|---|---|---|---|
| 3,536,045 A | 10/1970 | Flocchini | |
| 3,765,373 A * | 10/1973 | Phillips .................. | 119/14.04 |
| 3,792,686 A | 2/1974 | Needham et al. | |
| 3,828,733 A | 8/1974 | Correia | |
| 3,877,419 A | 4/1975 | Rodger | |
| 3,937,297 A | 2/1976 | Jacobs et al. | |
| 4,000,718 A * | 1/1977 | Brown .................... | 119/14.03 |
| 4,006,712 A | 2/1977 | Peel | |
| 4,207,837 A * | 6/1980 | Schwartau et al. ...... | 119/14.03 |
| 4,261,292 A * | 4/1981 | Le Du .................... | 119/14.04 |
| 4,323,033 A | 4/1982 | Vosyka et al. | |
| 4,419,961 A | 12/1983 | Vandenberg et al. | |
| 4,763,605 A * | 8/1988 | Braum .................... | 119/14.03 |
| 4,936,255 A | 6/1990 | Pera | |
| 5,000,119 A | 3/1991 | Moreau et al. | |
| 5,042,428 A | 8/1991 | Van der Lely et al. | |
| 5,140,942 A | 8/1992 | Flocchini | |
| 5,285,746 A | 2/1994 | Moreau | |
| 5,392,731 A | 2/1995 | Hoppman et al. | |
| 5,469,808 A | 11/1995 | Street et al. | |
| 5,483,921 A | 1/1996 | Waybright | |
| 5,507,247 A * | 4/1996 | Tecza et al. ............. | 119/14.03 |
| 5,615,637 A * | 4/1997 | Nelson .................... | 119/14.03 |
| 5,638,768 A | 6/1997 | Moreau | |
| 5,768,997 A | 6/1998 | Meier | |
| 5,782,199 A * | 7/1998 | Oosterling ............... | 119/14.02 |
| 5,784,994 A | 7/1998 | van der Lely | |
| 5,960,736 A | 10/1999 | Ludington et al. | |
| 6,050,219 A | 4/2000 | van der Lely | |
| 6,116,188 A | 9/2000 | van der Lely | |
| 6,161,502 A | 12/2000 | Simpson et al. | |
| 6,167,839 B1 * | 1/2001 | Isaksson et al. ......... | 119/14.02 |
| 6,205,949 B1 | 3/2001 | van den Berg | |
| 6,450,118 B1 * | 9/2002 | Eppers, Jr. ............... | 119/14.53 |
| 6,516,744 B1 * | 2/2003 | Bjork et al. ............. | 119/14.02 |

\* cited by examiner

*Primary Examiner*—Teri Pham Luu
*Assistant Examiner*—Elizabeth Shaw
(74) *Attorney, Agent, or Firm*—Roger Aceto, Esq.; Brian B. Shaw, Esq.; Harter, Secrest & Emery LLP

(57) ABSTRACT

A milking parlor has a holding gate and a parallel spaced individually loaded-occupied-unloaded milking stall with an operator pit located intermediate the holding gate and the milking stall. The operator pit can be recessed from the holding gate and the milking stall, wherein a bridge or a bridge cart selectively connects a holding gate to an unoccupied milking stall. A robotic or human operator can function from the operator pit to implement the milking process.

11 Claims, 14 Drawing Sheets

MILKING PARLOR FOR THE FORWARD STRAIGHT LINE ANIMAL AMBULATION AND INDIVIDUAL PRESENTATION OF AN ANIMAL TO BE MILKED IN A MILKING STALL LOCATED INTERMEDIATE A HOLDING AREA AND A RELEASE AREA

FIELD OF THE INVENTION

The present invention relates to the presentation of an animal to be milked in a milking parlor, and more particularly, to the straight line forward loading and forward unloading of an animal to be milked in a milking stall.

BACKGROUND OF THE INVENTION

A milking parlor generally includes an array of individual milking stalls, each milking stall being designed to hold a cow or other dairy animal while being milked. Typically, an operator or milking robot is required to perform such tasks as insuring that the animals are properly situated in the milking stalls, washing the udder prior to milking, applying milking units; monitoring and attending to operation of the milking units and post dip the teats.

Generally, there are two principle ways to milk cows. One method is to bring the milking equipment to the cows while the cow is retained in a, often described as around the barn pipeline, or pipeline, tie-stall, and stanchion barn. The alternative method of milking cows is to bring the cows to the milking equipment. This arrangement is known as free-stall or milking parlor. There are several ways to configure the milking system.

Pipeline Milking System

In the pipeline milking system, each cow is confined to its own stall or stanchion (headlock device). In the stall, the cow is fed, watered and can lie down. The cow is restrained to the stall by tying (tie-stall) or stanchion.

A milk line is routed over the stalls along with a pulsator line and any electrical lines needed to operate corresponding milking units. Routing the milk line over the stalls is referred to as a high line. The milk line routes the milk to a milk room by gravity where the milk is pumped into a bulk tank. Ports or stall cocks are located between the stalls to which individual milking units connect.

In operation, the operator takes the milking unit to the stall and operably connects the milking unit to the stall cock. The milking unit is then applied to the cow. In this configuration, the operator attaches milking unit from one side of the cow and in between two adjacent two cows.

When the cow has been milked out, the operator removes the unit and applies it to the next cow, moving the unit from stall cock to stall cock as the process moves throughout the barn.

As with any system, there are efficiency benefits and drawbacks to the pipeline milking system. One benefit is that the system allows the operator to prepare the next cow for milking while the previous cow is being milked. When the first cow is finished milking, the unit can be immediately moved to the prepared next cow. However, the pipeline system induces significant operator fatigue. The milking process requires the operator to bend over or squat down to access the udder for preparing, milking and post dipping. There is also considerable freedom for the cow to move around within the stall, which results in milking units being kicked off or stepped on. Immediate attention is required by the operator upon a milking unit being kicked off or stepped on. Further, there is little to protect the operator from being kicked or stepped on. As each stall requires a corresponding stall cock, a large number of stall cocks are employed and any percentage of failure or leakage results in required maintenance. Further, some portions of the milk line may be soiled by milk and not cleaned for hours, as the milking process has moved to another part of the barn. Also, the relatively long pipe lengths cause hot washing water to cool very quickly. In addition, once the milk has been extracted from the cow, it must be lifted to the pipeline running above the stall. Typically, this elevating process is done with the same vacuum used to extract the milk. Thus, a stable vacuum at the cow teats is very difficult to achieve. Although automation devices such as milk meters and automatic take offs have inherent individual benefits, it is difficult to implement these devices, as they must be carried from cow to cow and secured to each stall.

Parlor Milking System

In the parlor milking system, each cow has a stall where it can lay down, however, the cows are not restrained to the stall and may move about the barn (free stall). For milking, the cows are gathered and taken to the milking parlor. Fences or gates form the milking stalls of the milking parlor and control the flow and position of the cows in the parlor. The fences and gates also serve to protect the operator from getting kicked or stepped on. Typically, the milking stalls are considerably smaller than those found in free stalls or tie stalls, as it is not intended that the cows lay down in the milking stall. This closer confinement reduces freedom of movement of the cow and results in less kick off of the milking unit. As the milking equipment is not manually moved from cow to cow, automatic take offs and milk meters can be permanently mounted and utilized efficiently in the milking parlor system.

Herringbone Milking Parlor—Batch Operation

The herringbone-milking parlor includes two rows of milking stalls separated by an operator pit. The milking stalls arrange the cows for milking from the side. The cows enter the milking parlor in a single file and turn at an angle away from the operator pit. The cows overlap each other and thus form a herringbone pattern. The operator works from the pit, which is a lowered area between the opposing rows of milking stalls. In the lowered operator pit, the operator is able to stand upright and attend to the cows without having to bend or squat down. The milk line is located along a side of the operator pit or in a basement below the parlor floor and is lower than the cow udder. This configuration provides for more stable vacuum at the teats, as the milk is not lifted by vacuum. Locating the milk line lower than the cow's udder is referred to as a low line system. However, as this herringbone parlor is a batch processing, when the first cow is finished milking it must wait until all the cows in the batch are finished before the cow can leave. Therefore, inefficiencies are encountered as milked cows in a batch cannot be replaced until the last cow in the batch has been processed.

Tandem Parlor—Batch or Single Operation

The tandem parlor also includes two rows of milking stalls separated by an operator pit. The milking stalls are arranged for milking the cows from the side. The cows enter the milking parlor single file and stop without turning away from the operator pit. This configuration requires a much longer milking parlor than other milking parlors having the same capacity. Adjacent milking units in the tandem parlor are spaced by the length of a cow This long spacing between milking units causes the tandem parlor to have a long walking distance for both animals and operators. Known variations of this arrangement allow each stall to have its own entrance and separate exit gate thereby allowing the operator to release a cow when it is finished and let a new cow into that stall even though the rest of the cows in that side are still milking. Typically, the tandem parlor also employs a low line.

Parallel Parlor—Batch Operation

A parallel parlor also includes two rows of milking stalls separated by an operator pit. The milking stalls arrange the cows for milking from between the rear legs. The cows enter the parlor in a single file and turn perpendicular to the operator pit in a parallel cow-to-cow orientation. The parallel parlor allows for a very short milking parlor with each milking unit being spaced by only a cow width from the next adjacent milking unit. Further, since the milking is done from between the rear legs, the milking equipment is located where manure would fall upon it. A gutter is required to catch the manure before it can soil the milking equipment. The cows tail can also hinder milking from between the rear legs. Often trimming or docking the tail enhances efficiency of the parallel parlor.

Flat Barn Parlor—Single Operation

The flat barn-milking parlor includes one or two rows of milking stalls with no recessed operator pit or an elevation change in the milking parlor that can be handled by the cow stepping up. It is similar to the pipeline type arrangement, wherein, the operator milks the cows from the side and thus the operator must bend or squat to access the udder. Like the pipeline type arrangement, the operator has to attach milking units to the cow in between two adjacent cows. It is difficult to attach the milking unit from behind in between two rear legs of the cow. The operator can be easily soiled or wetted by the cow. The front quarters of the teat is hard to reach from behind.

Because there is no recessed operator pit, the cows can enter the milking stalls from the rear of the stall without having to move in a single file. This allows the operator to release a cow from the stall as soon as the cow is finished milking. The next cow may be then introduced into the milking stall from the rear of the milking stall. Some flat barn parlors have small recessed operator pits at each milking station where the operator steps down into the pit and does not have to bend over as far to milk the cow. Typically, these pits are located in between two adjacent milking stalls and do not run the length of the milking parlor and to reach more than two cows, the operator must step up out of one pit and step down into the next pit. Most flat barn parlors use a high line as cow traffic prevents the use of a low line. However, the operator walking distance in a flat barn parlor is longer than other parlor arrangements of equal capacity. That is, the stalls are arranged either in a single row, or the two rows of stalls are far enough apart to allow cow traffic between the rows. The flat barn parlor induces operator fatigue from the long walking distance and the need to either bend or squat to access the udder or climb in and out of individual recessed operator pits.

Rotary Parlor—Single Operation

In an effort to overcome the considerable time for cows to enter and fill the milking parlor in the herringbone and parallel parlor configurations, the rotary parlor is employed. The rotary parlor does not load and release cows in groups as do the herringbone and parallel arrangements. In contrast, the rotary parlor arranges a herringbone, tandem or parallel type stalls around a moving platform. When an empty stall passes the loading gate, a cow forwardly moves into the empty stall. The cow is milked either from the side or between the rear legs, depending upon the milking stall arrangement, as the milking parlor continues to rotate. Prior to reaching the entrance gate, where the cows are introduced, the milked cow is exposed to an exit gate. The speed of the rotation of the parlor is usually set such that cows requiring the longest time for milking are finished milking before reaching the exit gate.

However, there is no provision for releasing a cow as soon as the cow is finished and replacing the then empty milking stall with a fresh cow.

In most rotary parlors, the operator(s) can not see all of the animals in the parlor. A unit fall off may go undetected until an operator post dips the animal. If the operator detects a condition that requires immediate attention, they must chase the stall to remedy the situation.

The rotary parlor prevents the operator from having to wait for groups of cows to load into the parlor, but cows having a milking time that is less than the rotation time, must still wait before they can exit the parlor.

The rotary parlor uses a low line. However, the rotation of the rotary parlor requires a multitude of moving parts and enhanced complexity to install and service. For example, service connections to the parlor, including plumbing, vacuum, communications and electrical must be dynamic.

Therefore, a need still remains to enhance the efficiency in milking cows by eliminating idle time for both the operator and the equipment. The need exists for a method of presenting animals to be milked, wherein milking equipment and associated automation devices allow the operators to milk more cows faster than in a conventional milking system. The further need exists for enhancing ergonomic working conditions for operators.

SUMMARY OF THE INVENTION

The present milking parlor provides for individual sequencing of animals to be milked.

The milking parlor provides for a method of individually presenting an animal to be milked, including forwardly loading the animal into a milking stall through a rear ingress gate of the milking stall; milking the animal; and forwardly unloading the animal from the milking stall through a front egress gate. In a preferred configuration, the animal does not change a direction of travel during loading, milking and unloading. That is, the animal does not navigate any turns, and ambulates along a single forward straight path. Further, the milking stalls can be oriented to provide for rear milking (similar to a conventional parallel parlor operation), or underneath milking, or side milking (similar to a conventional herringbone parlor operation) of the animals. Prior to loading the animal into the milking stall, it is contemplated the animal can be led from a holding gate. In a further embodiment, the animal is passed through or over an operator pit intermediate the holding gate and the milking stall.

Thus, the milking parlor includes holding gate, which disposes a longitudinal axis of the animal parallel to milking stall longitudinal axis. The milking stall includes a milking stall entrance gate and a milking stall exit gate located on the milking stall longitudinal axis. In certain configurations, the longitudinal axis of the animal retained by the holding gate and the milking stall longitudinal axis are co-linear.

The present disclosure contemplates three primary configurations.

In the first primary configuration, the milking parlor has a flat operator pit adjacent a rear of the animal to be milked.

It is understood a flat operator pit, may be recessed, but has a sufficiently smaller recess such that the animals can negotiate across the operator pit. In this primary configuration, a plurality of milking stalls having rear ingress gates and front egress gates are disposed along a side of the operator pit and a corresponding plurality of holding gates disposed along an opposed side of the operator pit. In this primary configuration there is a one-to-one relationship between the holding gates and milking stall. It is understood that if the width of the operator pit become so narrowed the holding gates and the ingress gates of the milking stall can be combined.

In the second primary configuration, a single holding gate cooperates with a cart to translate an animal to one of a plurality of milking stalls, which milking stall is unoccupied whereupon the animal ambulates forwardly from the cart to occupy the stall. In this primary configuration there is a one-to-many relationship between the holding gates and milking stalls. Thus, there can be a plurality of holding gates servicing a greater plurality of milking stalls.

In a third configuration, the milking parlor includes a plurality of milking stalls aligned along one edge of operator pit and a corresponding plurality of holding gates aligned along an opposing edge of the operator pit, wherein a bridge operably connects a holding gate and corresponding unoccupied milking stall to provide access from the holding gate to the milking stall. It is understood different kind of bridges can be used. In this configuration there is also a one-to-one relationship between the holding gate and milking stall.

DETAILED DESCRIPTION OF THE PREFERRED EMBODIMENT

Figure 1:
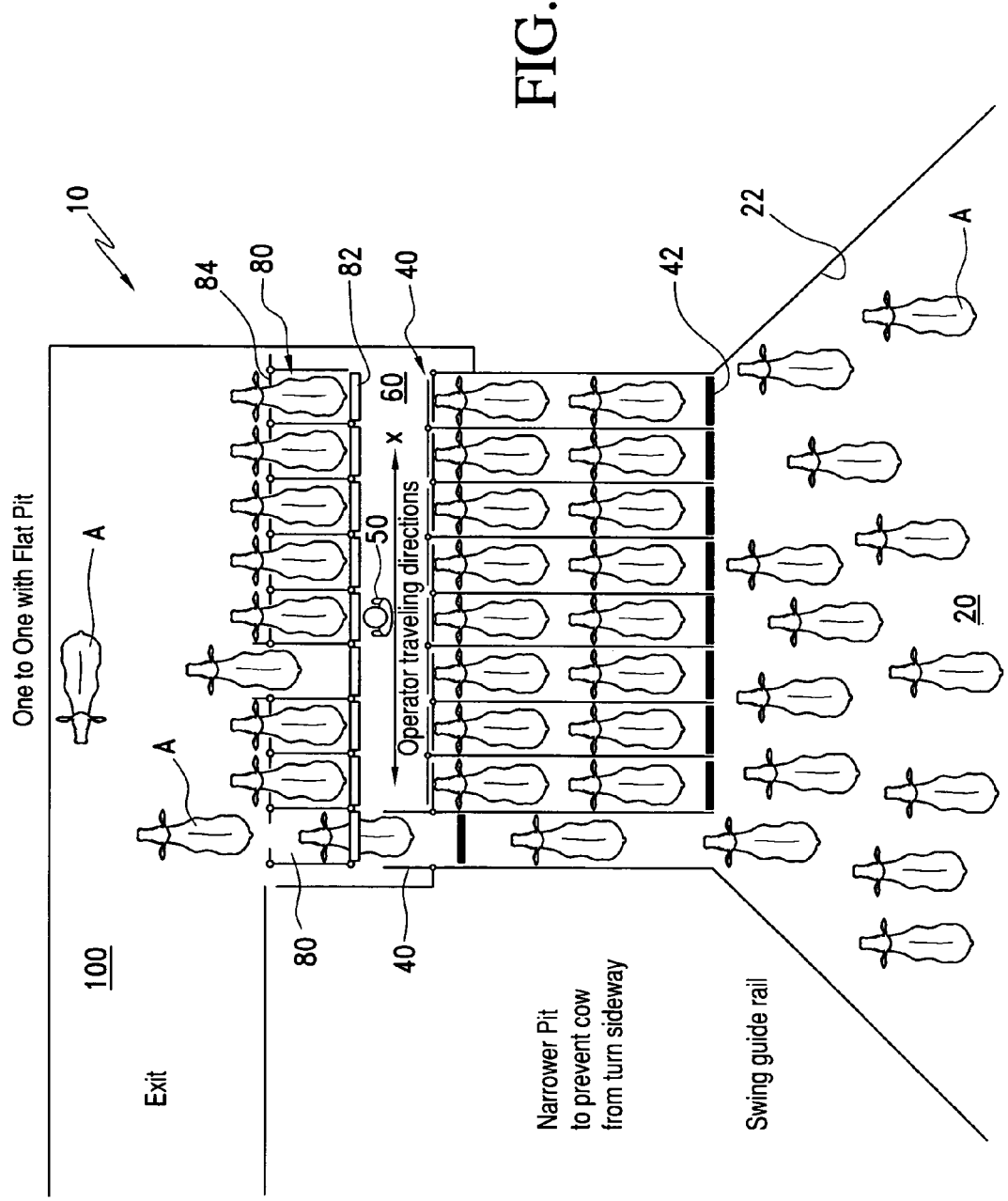
FIG. 1 is a top plan view of a one-to-one walk through milking parlor with a flat operator pit.

The present system provides a milking parlor 10 for milking a plurality of animals A on a continuous, individual basis, without encountering the inherent limitations of batch processing.

As used herein the term "rear milking" means accessing the teats from between, or through the rear legs of the animal A. The term "side-milking" means accessing the udders from between the front leg and the rear leg along one side of the animal A.

Although the present system is described in terms of presenting the animal to be milked, and specifically of milking cows, it is understood the system is applicable to any domesticated milk producing animal including, but not limited to goats, sheep, bison, llamas and yaks. For the purpose of clarity the term "animal to be milked" is shortened to "the animal."

The term "loading" the animal A into a stall means introducing the animal into the stall. In contrast, the term "unloading" the animal from a stall means extracting the animal from the stall.

The modifier "forward" or "forwardly" when used in connection with the animal means the animal proceeding in a direction of travel being led by its head. The modifier "rearward" or "back" when used in connection with the animal A means a direction of travel that is led by the tail or hind legs of the animal.

In this configuration, the term back or rear end of a respective stall means that end which is adjacent the hind quarters or rear legs of the animal A upon the animal being operably retained within the stall. A front or forward end of the stall corresponds to that end of the stall adjacent the front legs or head of the animal A upon being operably retained in the stall.

The milking parlor 10 includes a holding area 20, at least one holding gate 40, an operator pit 60, at least one milking stall 80 and a release area 100, to define a processing path from the holding area through the holding gate, across the operator pit, through the milking stall and to the release area. Optionally, the milking parlor 10 can include or be operably connected to a controller 120. The controller 120 is a processor or microprocessor such as a computer, laptop computer or dedicated processor.

Prior to milking, the animals A are temporarily retained within the holding area 20. The holding area 20 defines a space in which the animals are collected from free stalls grazing or other non-milking activity. The holding area 20 is preferably connected to the holding gates 40 by converging chutes 22. The chutes 22 direct and limit animal travel to a linear single file procession. The chutes 22 can funnel animal traffic to a single holding gate. Alternatively, a given chute 22 can funnel animals to a plurality of holding gates 40.

The holding gate 40 includes a longitudinal axis $LA_{HS}$. The holding gate 40 can optionally cooperate with and include an entrance gate 42 located along the longitudinal axis $LA_{HS}$. The entrance gate 42 can selectively define a barrier to the corresponding chute 22. That is, the entrance gate 42 can permit one way travel of an animal A from the chute 22 to the holding gate 40. Thus, once an animal A is disposed at a holding gate 40 the animal cannot back up into the chute 22.

The holding gate 40 opens to provide access to the operator pit 60.

The entrance gate 42 and the holding gate 40 can be any of a variety of configurations. The entrance gate 42 and the holding gate 40 can be of the same type, or different.

The entrance and holding gates 42, 40 can be any of a variety of configurations including horizontally or vertically swinging gates as well as vertically or horizontally translating gates. That is, the entrance and holding gates 42, 40 can be a swing gate, a slide gate or a lift gate. The entrance and holding gates 42, 40 are movable between an opened and a closed position. Movement of the entrance and holding gates 42, 40 between the opened and the closed position can be provided by human or automated actuators 46. The actuators 46 include, but are not limited to pneumatic, gear, chain, and hydraulic or biased actuators. The actuators 46 can be manually or automatically triggered. That is, sensors (not shown) can be operably located relative to the holding gate 40 or the entrance gate 42 to provide a signal for opening or closing the entrance and holding gates. Available sensors include position or location or pressure sensors, as well as process sensors connected to the milking process and particularly termination of the milking process in a corresponding milking stall 80. The actuators 46 and sensors can be operably connected to the controller 120 for regulating the opening and closing of the entrance and holding gates 42, 40.

The operator pit 60 is located intermediate the holding gate 40 and the milking stall 80, and can be at the same elevation as the holding gate and the milking stall. Alternatively, the operator pit 60 can be recessed, or at a lower elevation than the holding gate 40 and the milking stall 80. The term recessed means at least an elevational change that cannot be navigated by the animal during progression through the milking parlor. Thus, the operator pit can be flat or recessed.

In one configuration, the operator pit 60 is disposed at a lower elevation than a floor of the holding gate 40 and milking stall 80. The recessed configuration helps reduces operator fatigue.

The operator pit 60 is configured to permit rear milking of the animal A, upon confinement of the animal to the milking stall 80. An operator 50 is disposed in the operator pit 60 to attend the milking process, including operating a milking machine. The operator 50 can be a human or a robotic device. It is contemplated the operator can be a human operator or a robotic operator, without effecting the scope of the present invention. Thus, the operator pit 60 can include any of a variety of commercially available robotic milking machines. Alternatively, the operator pit 60 is configured for human operators.

The dimension of the operator pit 60 extending between a holding gate 40 and a milking stall 80 is at least partially determined by intended operator 50. That is, if a robotic operator 50 is employed the dimension can be minimized.

The operator pit 60 can further include a mobile platform translatable across a rear end of the plurality of milking stalls 80 to allow access to the rear of the animal A retained in the respective milking stall. This allows the operator 50 to prepare the teats and attach the milking units without incurring significant stress or fatigue. In one configuration, the mobile platform travels along a rail or set of rails adjacent the rear end of the milking stalls 80.

In one configuration, employing a robotic operator, the milking stall 80 includes a milking claw moveable between a retracted position and an elevated milking position. The milking claw is fluidly connected to the milking line by a hose, hoses or pipe. Preferably, the connection of the milking claw to the milking line is flexible, so that the milking claw has a range of motion along the longitudinal and lateral dimension of the milking stall. A robotic arm can selectively raise the milking claw to engage the animal A and begin the milking process. Thus, the robotic actuating arm can be operably associated with each milking stall 80. Alternatively, the robotic arm is moveable across the rear end of the milking stalls 80, so that a single robotic arm can be used to selectively elevate a plurality of milking claws.

The robotic device can translate along a rail or set of rails for alignment with a respective milking stall 80. The actuating arm is moveable through at least one and typically three degrees of freedom for operably locating a milking claw relative to the teats. The actuating arm can be moved by any of a variety of mechanisms known in the art, including, but not limited to, hydraulics, pneumatics, servos, gearing, linkages and motors. In the rear milking configuration, the robotic device operably locates and withdraws the milking claw along a path between the rear legs of the animal A.

The robotic device can be combined with an alternative sensor means such as laser distance sensor, camera, infrared, touch sensor, proximity sensor or data base to locate the teat position before attaching the milking unit.

Each milking stall 80 includes a longitudinal axis $LA_{ms}$ with an ingress gate 82 and an egress gate 84 located on the longitudinal axis. The ingress gate 82 is located to permit selective passage from the operator pit 60 into the milking stall 80 and the egress gate 84 is located to permit selective passage from the milking stall to the release area 100.

The milking stall 80 is sized to confine the animal A to a generally predetermined and fixed location in the stall. That is, the animal A is not permitted to lay down, and has restricted lateral tolerance.

The milking stall 80 can be oriented perpendicular to the adjacent portion of the operator pit 60, or inclined (angled) relative to the operator pit, such as a herringbone pattern. In a preferred configuration, the longitudinal axis $HA_{HS}$ of the holding gate 40 and the longitudinal axis $LA_{ms}$ of the milking stall 80 are parallel. For some configurations, the longitudinal axes are collinear.

In addition, the number of holding gates 40 can be greater, equal to, or less than the number of milking stalls 80. Typically, the milking parlor 10 configurations are one-to-many, or one-to-one holding gates 40 to milking stalls 80.

As seen in FIGS. 4–11, in one configuration, the ingress gate 82 of the milking stall 80 is a lift style gate. The ingress gate 82 includes a splash shield 86, (manure gutter) and associated outlets. The splash shield 86 outlet is fluidly connected to discharge lines as known in the art.

It is understood the ingress gate 42, or a separate rail or pusher bar can be employed to urge the cow through the holding gate and into the milking stall.

The ingress gate 82 can be lifted by any of a variety of mechanisms including, but not limited to pneumatic, gear, chain, motor, servos, and hydraulic or biased actuators. Further, although the ingress gate 82 is shown as a lift gate, it is understood the ingress gate can be any of a variety of configurations including horizontally or vertically swinging gates as well as vertically or horizontally translating gates. That is, the ingress gate 82 can be a swing gate, a slide gate or a lift gate.

Similarly, the egress gate 84 of the milking stall 80 can be any of a variety of configurations including horizontally or vertically swinging gates as well as vertically or horizontally translating gates. That is, the egress gate 84 can be a swing gate, a slide gate or a lift gate.

The ingress and egress gates 82, 84 are movable between an open and a closed position. Movement of the ingress and egress gates 82, 84 between the open and the closed position can be provided by human or automated actuators. The actuators 88 include, but are not limited to pneumatic, gear, chain, and hydraulic or biased actuators. The actuators 88 can be manually or automatically triggered. That is, sensors 90 can be operably located relative to the milking stall 80 to be provide a signal for opening or closing the ingress and egress gates 82, 84. Available sensors 90 include position or location or pressure sensors, as well as process sensors connected to the milking process and particularly termination of the milking process. The actuators 88 and sensors 90 can be operably connected to the controller 120 for regulating the opening and closing of the ingress and egress gates 82, 84.

In further configurations, it is contemplated the milking stall 80 can include a milk meter. The milk meter can be connected to the milking claw or the milking line and the controller through a wired or wireless connection. The milk meter is known in the industry and typically includes a microprocessor and sensors for determining milk yield, milk temperature, milk conductivity, cow connection status, which data is transmitted to the controller 120.

Movement of the animals from the holding area to the release area, includes crossing the operator pit. In the one holding gate to one milking stall, flat operator pit configurations, the primary requirement is directing or guiding the animal from the holding gate to the corresponding ingress gate. That is, it is generally undesirable to have an unguided animal in the operator pit. Therefore, in the one-to-one flat pit milking parlor, the present invention can provide guidance of the animal along the portion of the path that crosses the operator pit. Although this guidance can be provided by a translating bridge, a forward/rearward sliding bridge, a transport cart, a swing bridge or a drop bridge, as these structures are described herein. Alternatively, sizing of the holding gate 40 and/or the ingress gate 82 can be selected to guide the animal across a flat operator pit. As seen in FIG. 1, the holding gate 40 includes a pair of arms, which pivot about spaced vertical axes, between a closed position and an open position. The arms are sized such that in the open position, a terminal end of the arm is sufficiently near the ingress gate 82 of the milking stall 80, to dictate travel of the animal from the open holding gate 40 to the corresponding milking stall.

Alternatively, a bridge can be used to define the available travel path from a holding gate 40 to a corresponding milking stall in the one-to-one milking parlor with a recessed operator pit. The bridge can be a swing bridge, as shown in FIGS. 8–11. In the swing bridge configuration, the swing bridge 40a includes a floor 40b and actuators (not shown), and optional upwardly extending side rails 40c. The optional side rails can prevent the animal from falling off the bridge. The swing bridge is rotatable about a horizontal axis between a raised (closed) position and a lowered (open) position. In the raised position, the floor of the swing bridge precludes forward motion of the animal. In such case, the bridge can function as the holding gate. Thus, a separate holding gate 40 can be eliminated. The rails thus extend along a side of the animal, toward the rear of the animal.

In the open position, the floor of the swing bridge spans the operator pit to provide a surface on which the animal can walk, and the rails dictate the animal travel to the corresponding unoccupied milking stall 80. The swing bridge can also be transportable along the longitudinal axis of the operator pit to align with other milking stalls.

Figure 14:
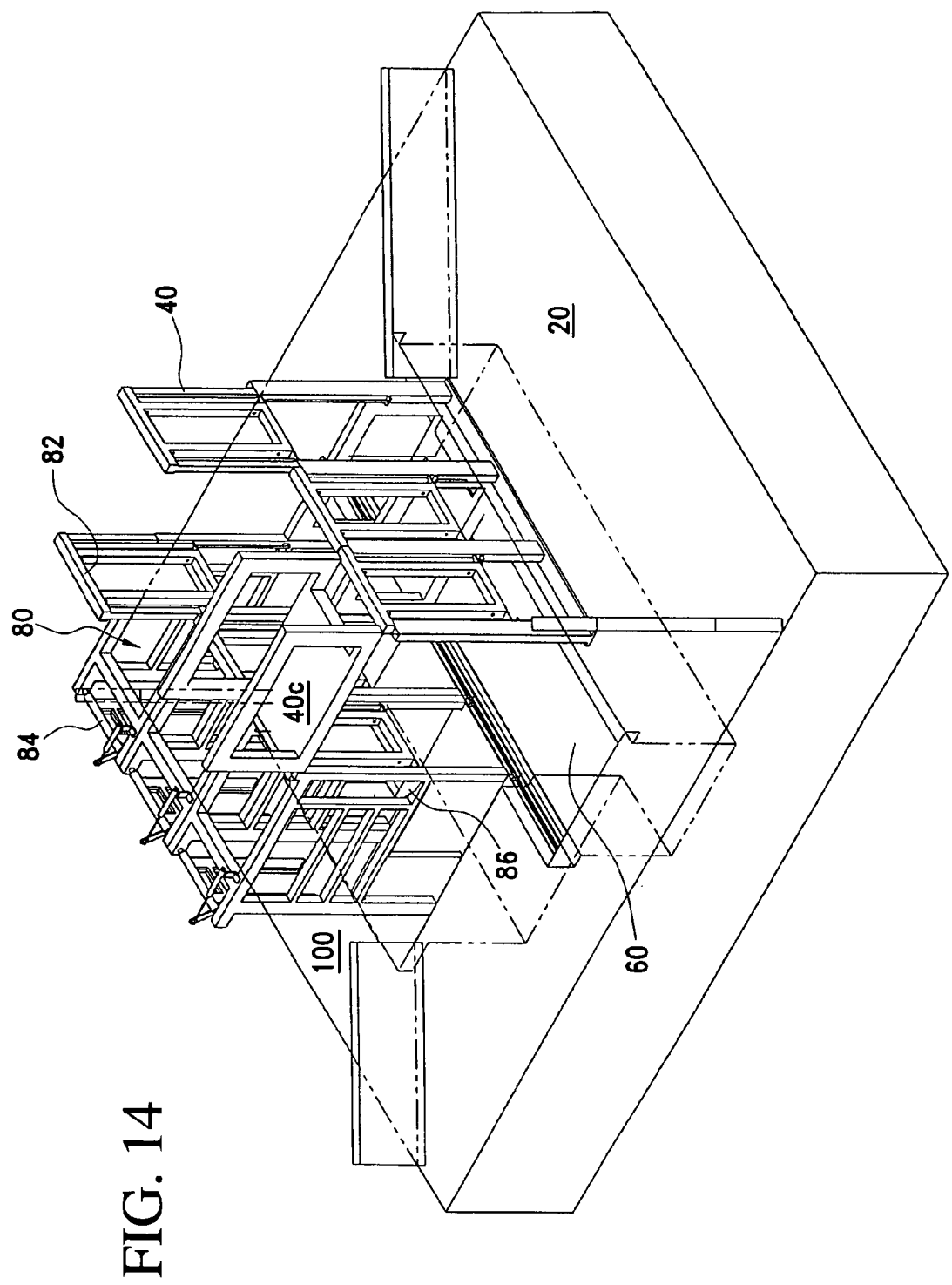
FIG. 14 is perspective view of the milking parlor having a vertically translating bridge.

In a further configuration, as seen in FIG. 14, the bridge can be a drop bridge 40e, moveable between a raised (closed) position and a lowered (open) position. The drop bridge 40e includes a floor, as in the swing bridge, and optional side rails for directing the animal.

It is understood the closed position can be either elevated above the operator pit (by a sufficient distance to allow the operator to work beneath) or a depressed position (forming a portion of the operator pit or precluding passage of an animal). The open position of the bridge permits passage of the animal through the holding gate and onto the bridge. This movement of the bridge, from the closed position to the open position, can include raising or lowering the bridge (depending upon the closed position).

Figure 12:
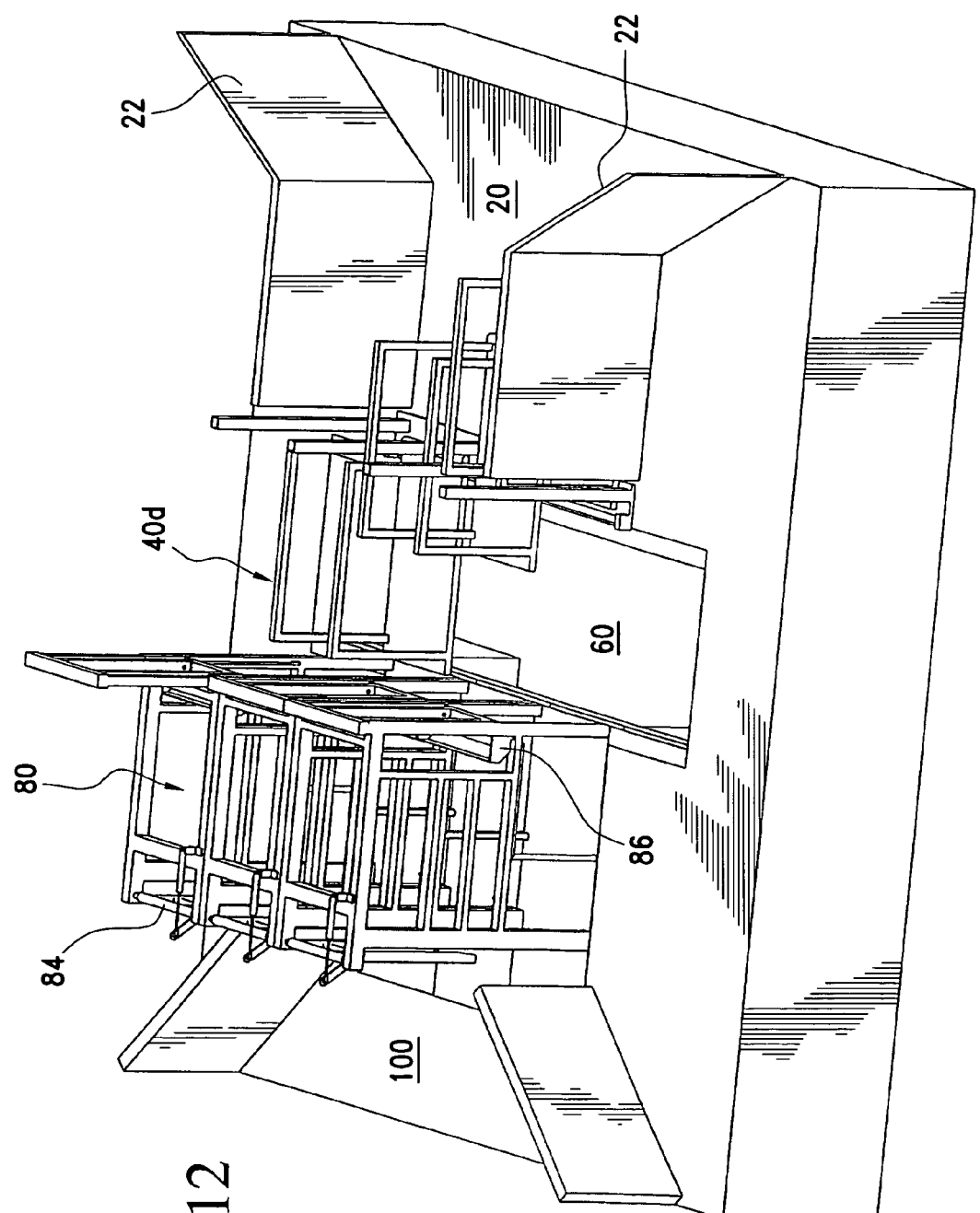
FIG. 12 is perspective view of the milking parlor having a slide bridge.
Figure 13:
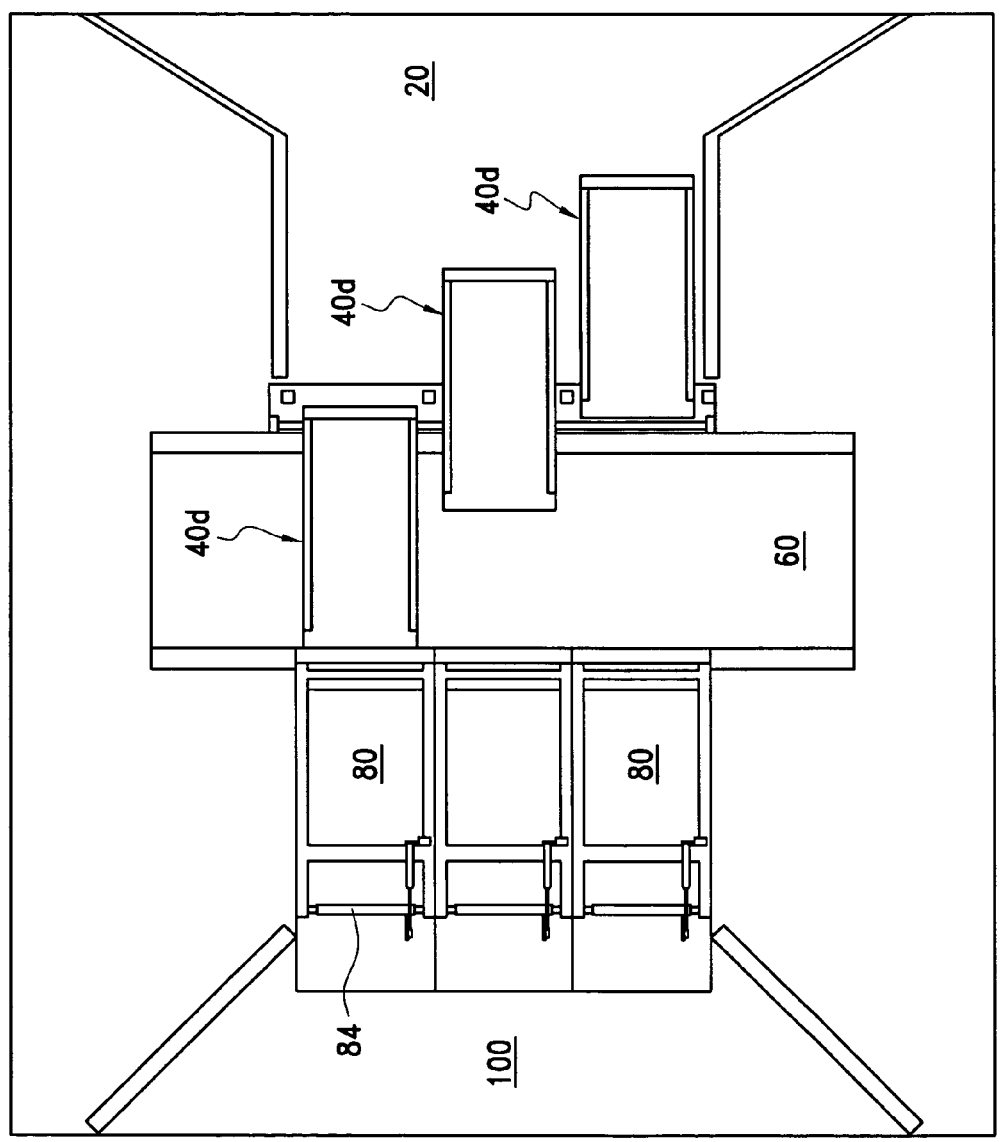
FIG. 13 is a top plan view of the milking parlor of FIG. 12.

In another configuration, as seen in FIGS. 12 and 13, the bridge can be a slide bridge 40d, moveable between a forward (open) position towards milking stall 80 and a backward (closed) position toward the holding gate 40. The slide bridge includes a floor, actuators, and optional side rails for directing the animal.

In the bridge configuration, the operator pit 50 can be either a flat pit or a recessed pit. That is, the bridge, either swing or drop or translate or slide, can be used in combination with a flat operator pit or a recessed operator pit.

Movement of the animal from the holding gate 40 to a milking stall 80 in a milking parlor having one holding gate to many milking stalls, can also be controlled by a bridge cart.

Figure 2:
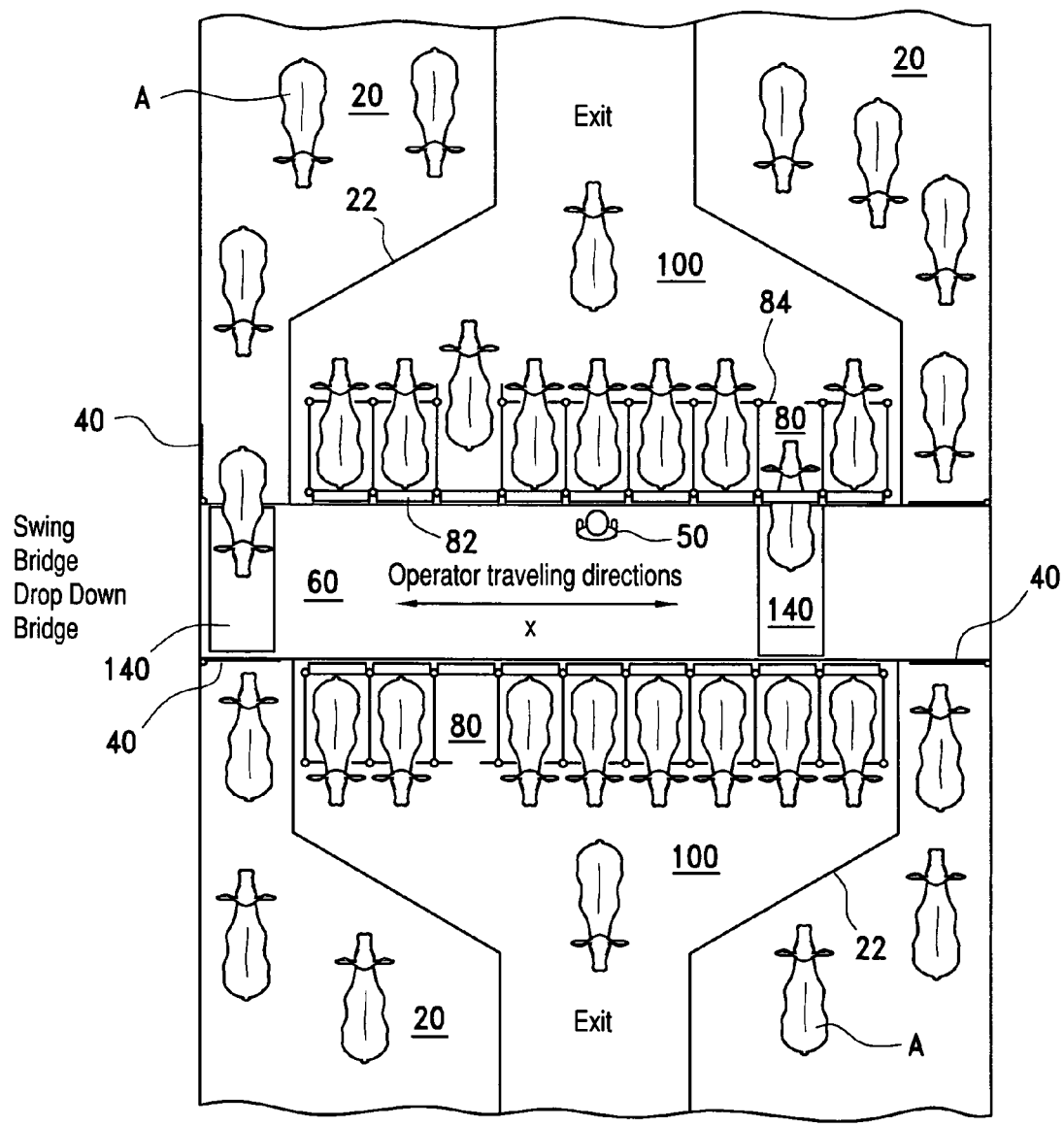
FIG. 2 is a top plan view of a one-to-many walk through milking parlor arrangement with a transport cart.
Figure 3:
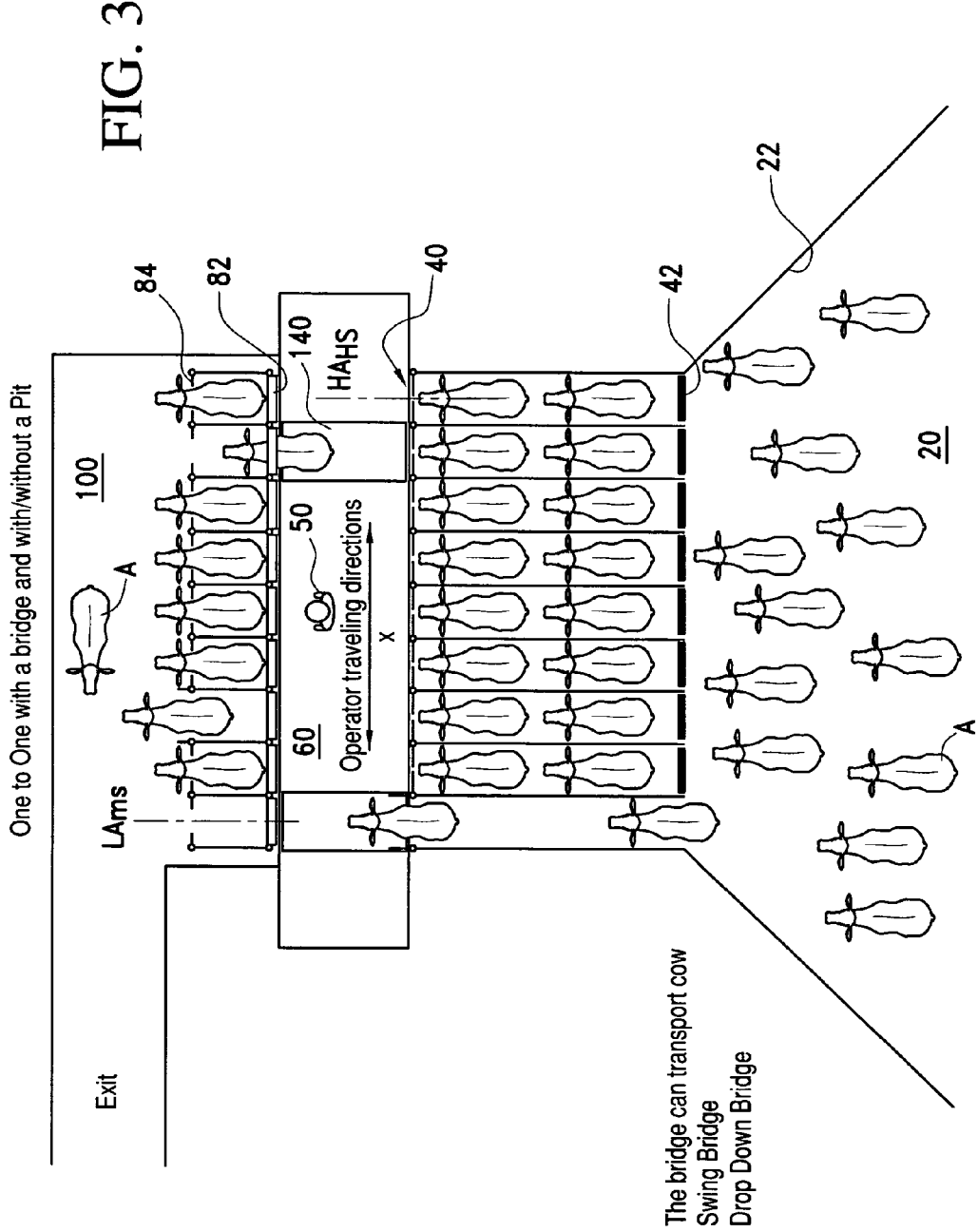
FIG. 3 is a top plan view of a one-to-one walk through milking parlor arrangement, with a bridge, wherein the bridge includes but is not limited to a translating, sliding, swing or drop bridge.
Figure 4:
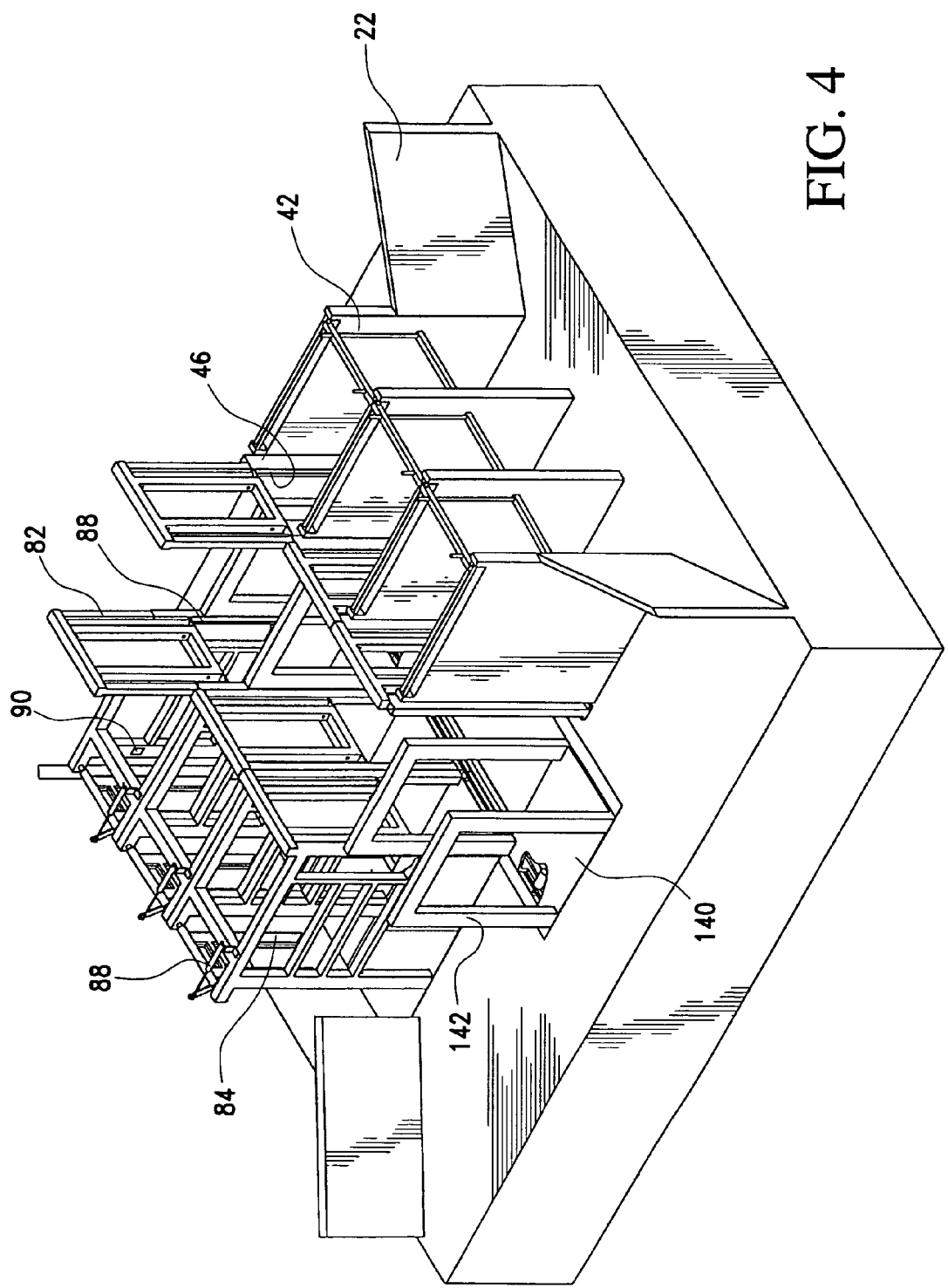
FIG. 4 is a perspective view of a one-to-one walk through milking parlor having a transport bridge.
Figure 5:
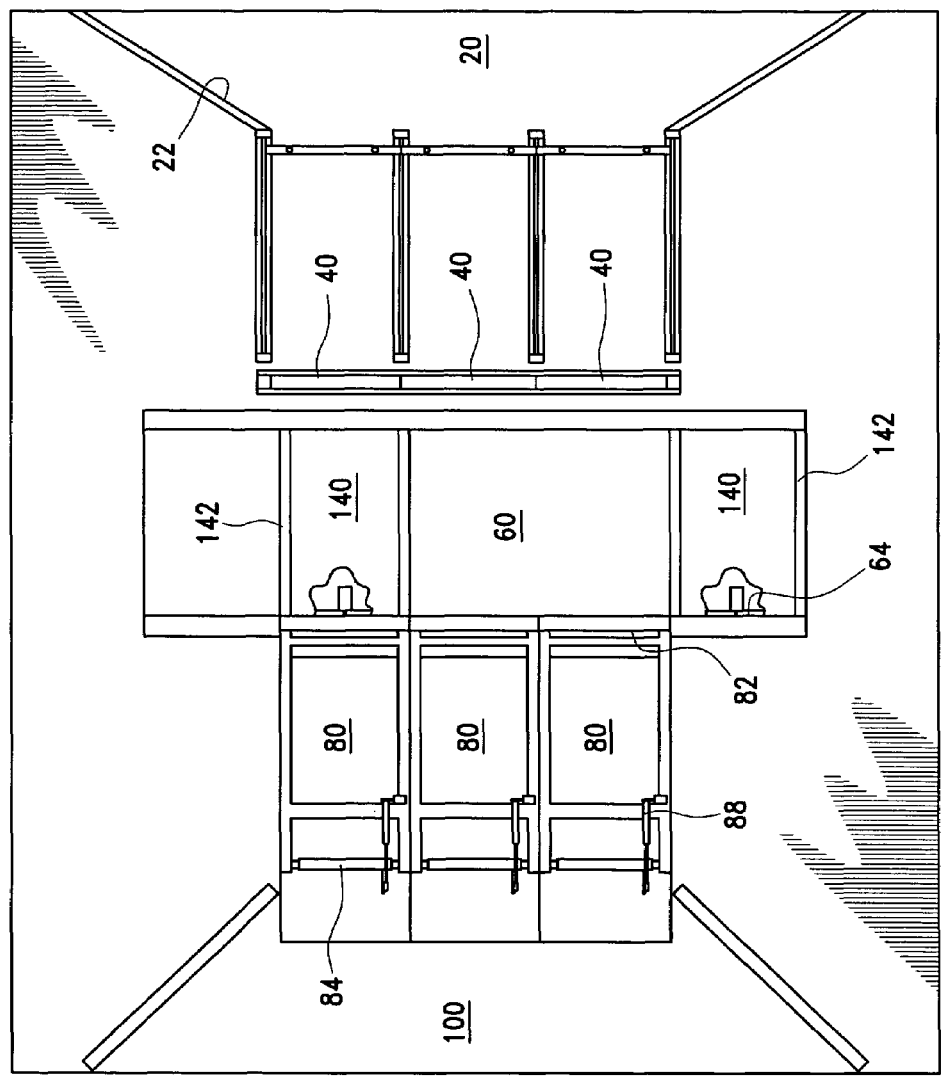
FIG. 5 is a top plan view of the milking parlor of FIG. 4.
Figure 6:
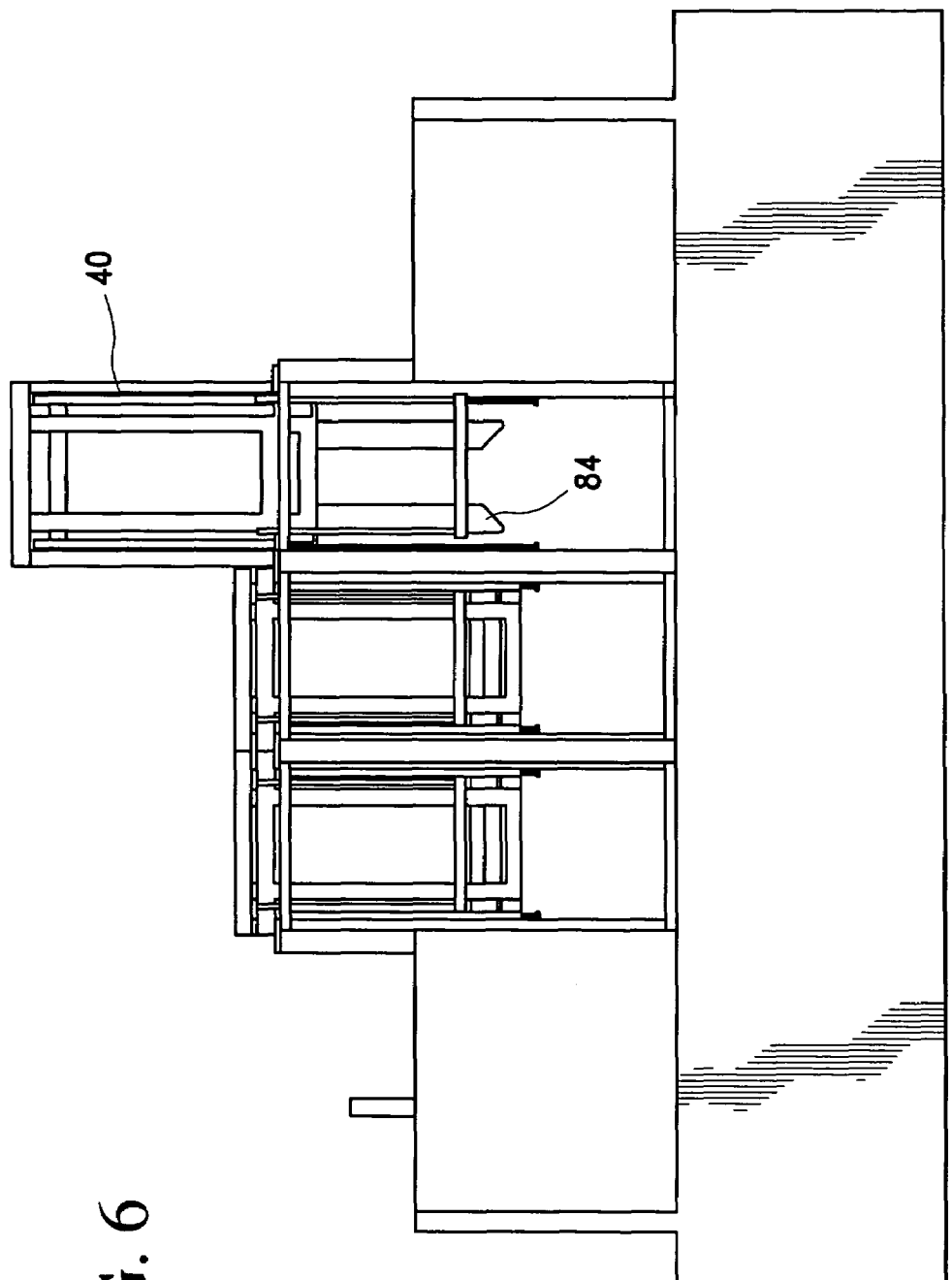
FIG. 6 is a side elevation view of the milking parlor of FIG. 4.
Figure 7:
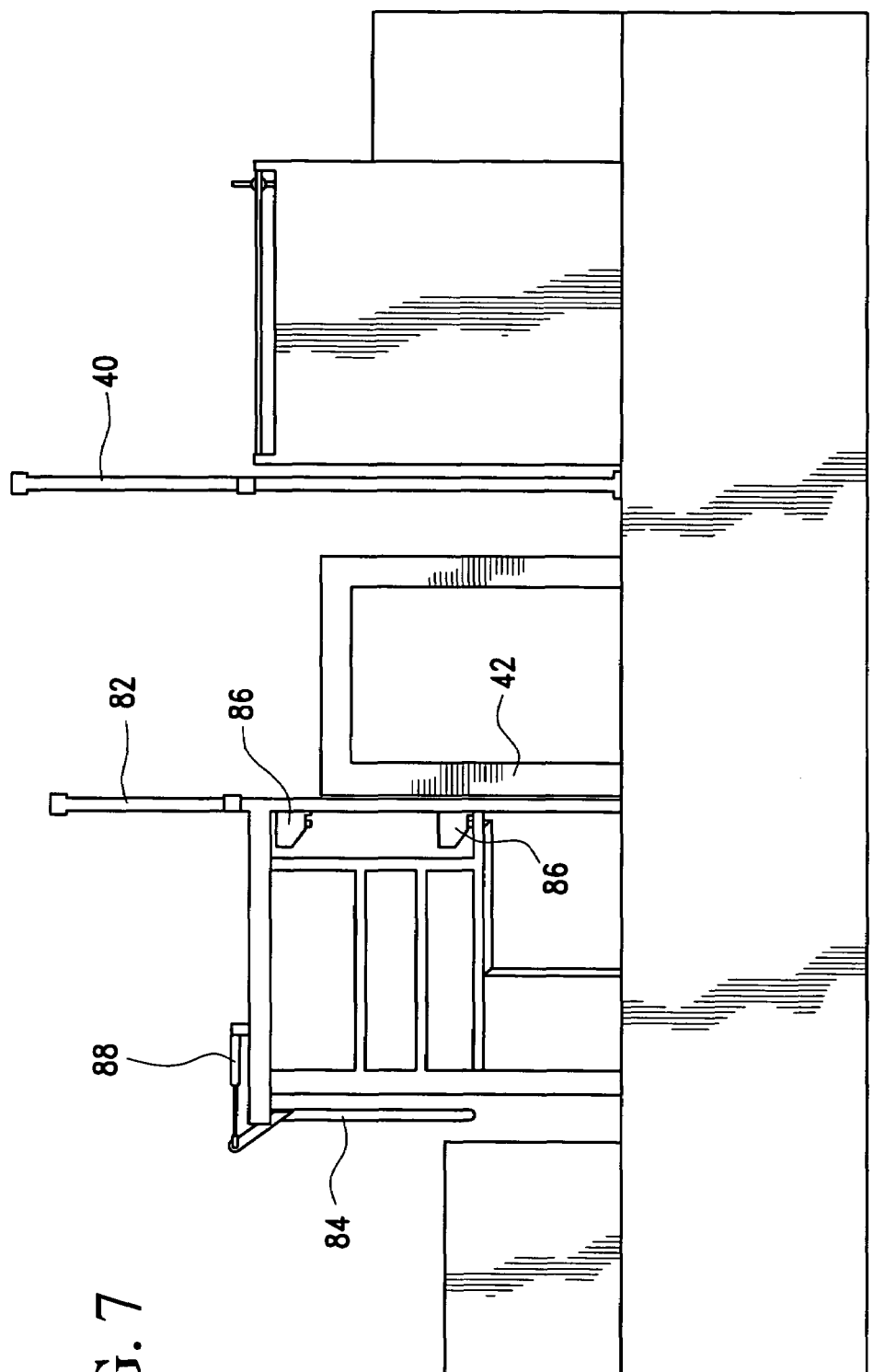
FIG. 7 is a front elevation view of the milking parlor of FIG. 4.
Figure 8:
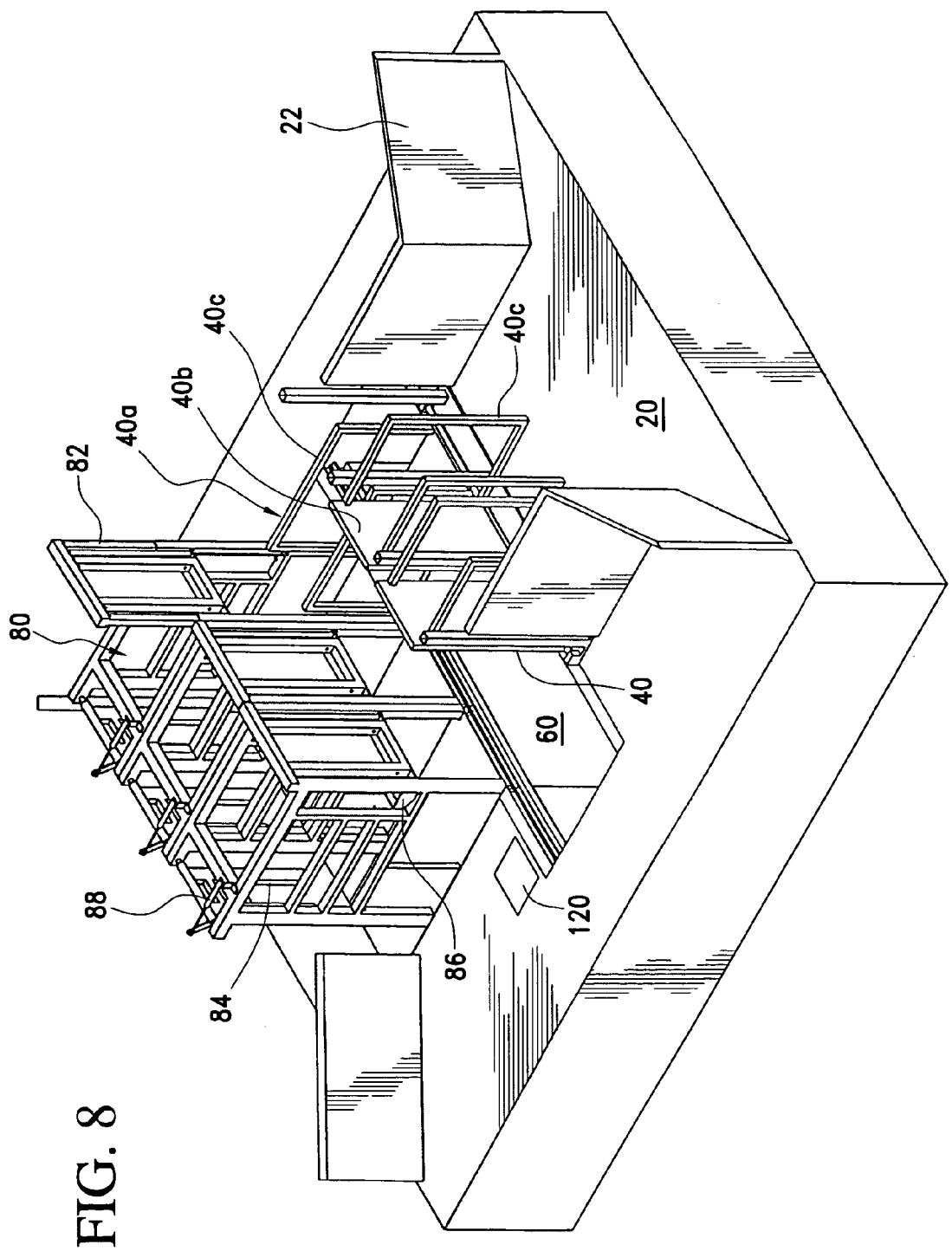
FIG. 8 is a perspective view of a one-to-one milking parlor having a swing bridge.
Figure 9:
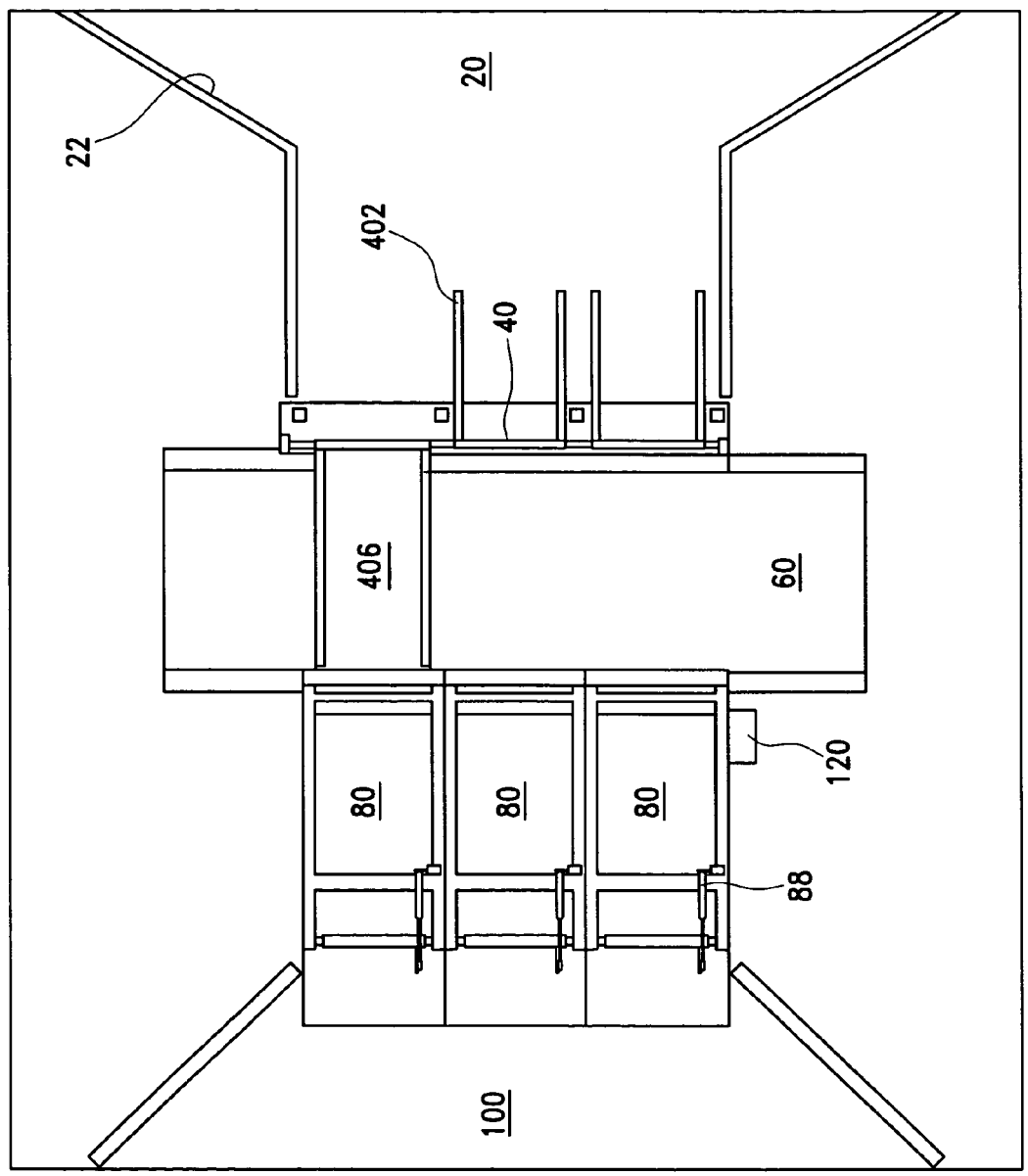
FIG. 9 is a top plan view of the milking parlor of FIG. 8.
Figure 10:
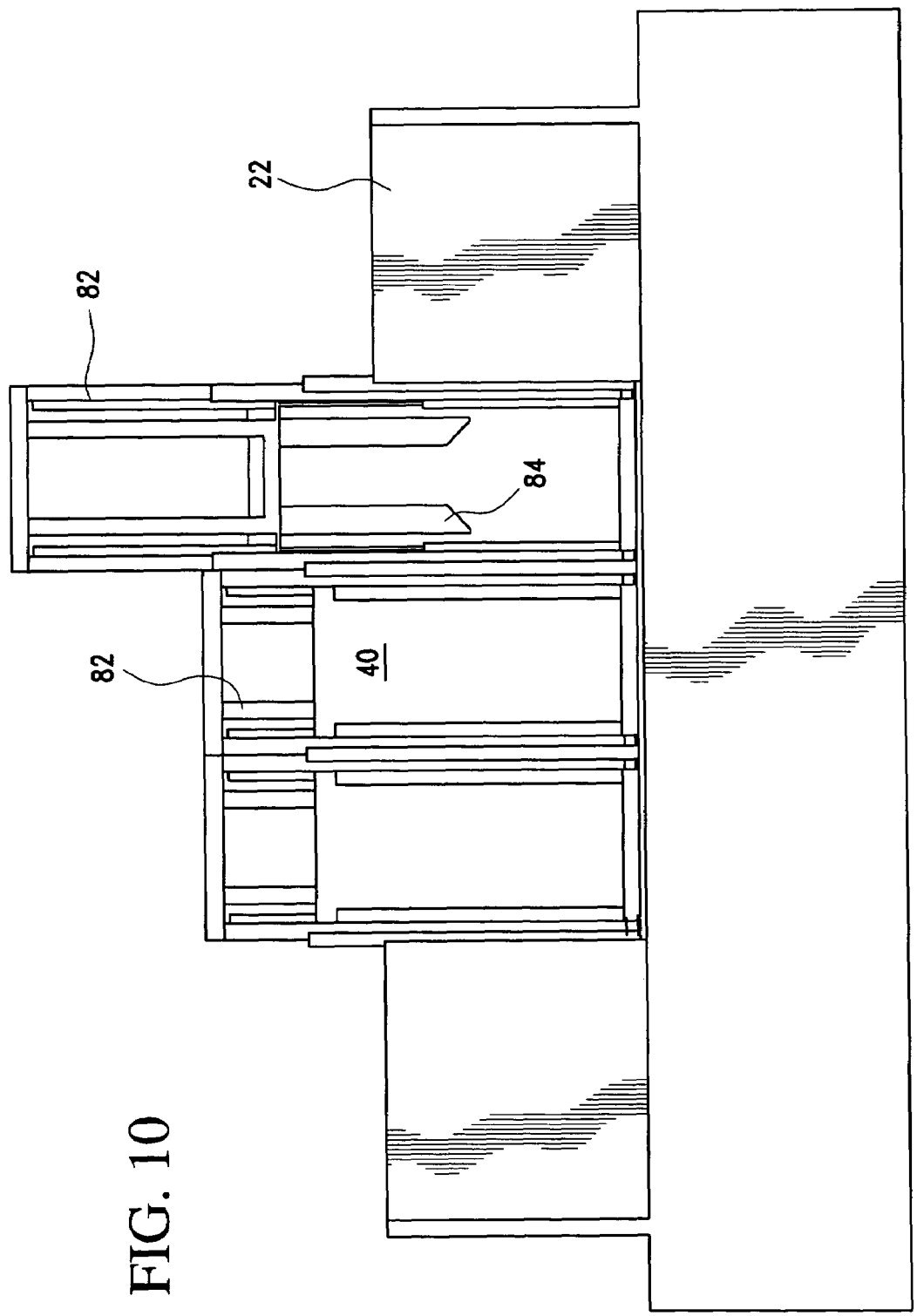
FIG. 10 is a side elevation view of the milking parlor of FIG. 8.
Figure 11:
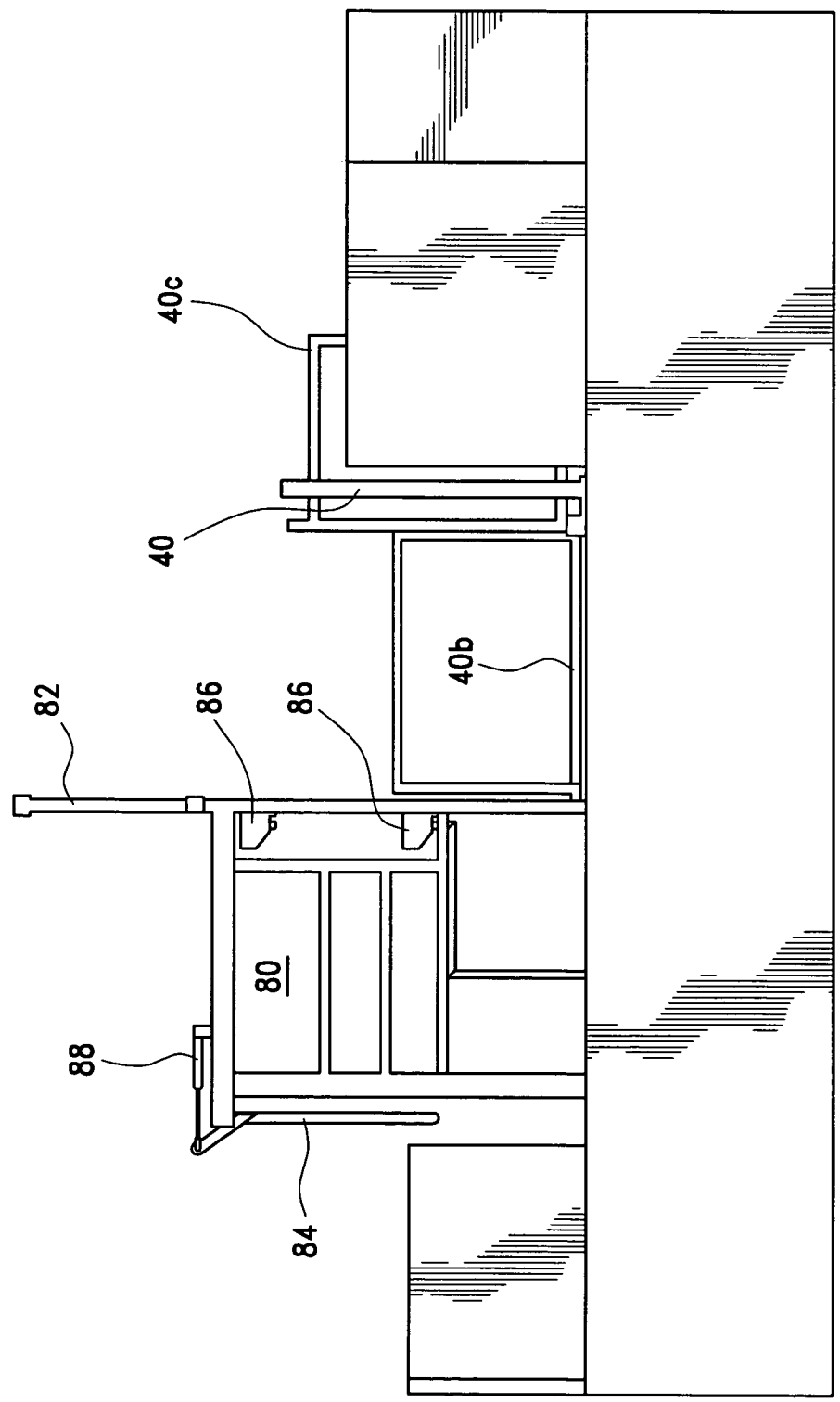
FIG. 11 is a front elevation view of the milking parlor of FIG. 8.

Referring to FIG. 2, the cart can be operably aligned at the holding gate 40, and subsequently translated horizontally to align with an unoccupied milking stall.

Alternatively, a cart, which moves only along a horizontal path can be used to transfer an animal from the holding gate to an unoccupied milking stall 80. The cart can be used in conjunction with either a flat operator pit or a recess operator pit.

As seen in FIGS. 1–7, the transport cart 140 is slideably disposed over a portion of the operator pit 60 at the elevation of the floor of the holding gate 40 and milking stall 80.

The cart 140 includes a pen or frame 142 for retaining the animal A on the cart as the animal moves relative to the cart, or the cart moves relative to the holding gate 40. The pen 142 usually includes at least side walls for precluding lateral movement or turning of the animal.

In this cart configuration, the holding gate 40 is employed for preliminary retention the animal A. The transport cart 140 is disposed adjacent to and aligned with the holding gate 40 and the animal to be milked passes from the holding gate onto the transport cart. The transport cart 140 is then moved transversely to operably align the bridge cart with a corresponding milking stall 80 and the animal to be milked walks forwardly from the transport cart into the milking stall.

The transport cart 140 or the bridge cart can be operably disposed by operator power, chain drives, hydraulic drives, pneumatic drives or electric motors. Initiation of cart translation can be by manual or automatic control. For manual control, the operator verifies the animal position in the transport cart 140 and directs the cart to align with the empty milking stall. In an automatic system, the controller 120 may receive signals form milking stall sensors indicating the empty or occupied status of a milking stall, as well as the position and occupancy of the transport cart 140. The controller 120 can thus locate the transport cart 140 at an occupied holding gate 40 to receive an animal A, translate the transport cart 140 to align with an empty milking stall 80. It is also contemplated the controller 120 can operate the ingress and the egress gates 82, 84 of the milking stall 80.

In a configuration of the recessed operator pit, with a one-to-one holding gate 40 to milking stall 80 correspondence, the transport bridge cart 140 is used to selectively connect a given holding gate with a corresponding milking stall. The holding gate 40 and the ingress gate 82 of the milking stall 80 are selectively opened to permit passage of the animal A from the holding gate 40, across the operator pit 60 and to the milking stall 80, wherein the ingress gate 82 of the milking stall is selectively closed to retain the animal therein. The transport bridge cart 140 can then be moved by operator or automatically to align an empty milking stall 80 with a holding gate 40.

Thus the animal A proceeds along a linear path from the holding gate 40, across the operator pit 60, through the ingress gate 82, through the milking stall 80 to exit through the exit gate 84 to the release area 100. Generally, the holding gate 40 and the milking stall 80 are parallel, and in some configurations, collinear. In a first configuration, a holding gate 40 is co-linear with a milking stall 80 with the operator pit 60 intermediate the holding gate and the milking stall.

The milking parlor 10 employs a plurality of parallel milking stalls 80, an operating pit 60 adjacent a rear or backend of the plurality of milking stalls, and a corresponding plurality of holding gates 40 to dispose the operating pit intermediate the backend of the milking stalls and the front end of the holding gates.

Thus, the processing path for an animal A through the milking parlor 10 includes being retained in the holding gate 40 by closure of the gate, passing from the holding gate 40, across the operator pit 60 and through an ingress gate 82 of the milking stall 80, being retained within the milking stall through closure of the milking stall ingress gate, and subsequently passing from the milking stall through the egress gate 84 of the milking stall. Preferably, the holding gate 40 and the milking stall 80 are co-linear disposed such that the animal A to be milked follows a straight linear path through each stall and the respective gates.

In addition, the controller 120 such as computer, personal computer or dedicated processor can be used for cooperatively operating the various elements of the milking parlor 10.

Referring to FIG. 2, it is also contemplated the present invention can be employed in a bi-directional flow path milking parlor. In the bi-directional milking parlor, there is a holding area and a release area along each side of the operator pit (which can be flat or recessed). As seen in FIG. 2, the animals converge from the holding area to holding gates at the end of the operator pit. While a single holding gate is shown, it is understood a plurality of holding gates can be employed, wherein the transport cart or bridge can define a single spot or a corresponding plurality of spots for retaining the animals.

The holding gate for each animal flow direction aligns with a corresponding holding gate for the opposing flow animal flow direction.

Operation

In operation, the animals A are directed to the holding area 20. The animals A are then urged or guided into the chutes 22 to load a lead animal to a holding gate 40. Depending upon the specific configuration of the milking parlor 10, the animal A is retained by the holding gate 40 in the closed position.

Upon a milking stall 80 becoming unoccupied, the transport cart 140 or bridge is translated to be aligned with the occupied holding gate 40. The holding gate is opened and the animal A walks into the transport cart 140 along the longitudinal axis of the cart.

In the one-to-many configuration of the milking parlor 10, the transport cart 140 is translated to align with the unoccupied milking stall 80. Alternatively, in the one-to-one configuration of the milking parlor 10, the transport cart 140 or bridge (and animal A) are aligned with the unoccupied milking stall 80.

The ingress gate 82 of the milking stall 80 is disposed in the open position and the animal A exits the transport cart 140 or bridge to load into the milking stall 80 without changing the direction of travel.

After loading of the animal into the milking stall 80, the ingress gate 82 is moved to the closed position. The operator 50, human or robotic, locates the milking claw 81 relative to the teats to operably engage the milking claw and the teats.

By control known in the industry, upon completion of the milking cycle, the milking claw is retracted or falls to the retracted position.

Thus, the present invention provides independently occupied and controlled milking stalls. Thus, the inherent limitations of batch processing, wherein the batch speed is limited by the slowest animal, the present milking parlor allows each milking stall to be maximized by responding to the actual usage of the milking stall.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

I claim:

1. A method of individually presenting an animal to be milked, comprising:
   (a) forwardly loading the animal into a milking stall through an ingress gate at a rear of the milking stall along a controlled path including a corresponding holding gate that opens and closes to allow access to the ingress gate; and
   (b) locating an operator pit intermediate the holding gate and the rear of the milking stall.

2. The method of claim 1 further comprising locating a bridge intermediate the holding gate and the rear of the milking stall.

3. The method of claim 2 further comprising locating at least one rail on the bridge.

4. A method of presenting an animal to be milked, comprising:
   (a) forwardly unloading the animal from a holding area through a holding gate;
   (b) translating the animal across an operator pit;
   (c) forwardly loading the animal into a milking stall through a milking stall ingress gate; and
   (d) forwardly unloading the animal from the milking stall through a milking stall exit gate.

5. The method of claim 4 further comprising milking the animal in the milking stall from the rear.

6. The method of claim 4 further comprising forwardly loading the animal onto a bridge cart after forwardly unloading the animal from the holding gate.

7. The method of claim 6 further comprising moving the bridge cart between a first position and a second position in the operator pit.

8. The method of claim 4 further comprising forwardly unloading the animal from a bridge cart prior to forwardly loading the animal into the milking stall.

9. A method of individually presenting an animal to be milked, comprising:
   (a) forwardly loading the animal into a milking stall through an ingress gate at a rear of the milking stall along a controlled path including a corresponding holding gate that opens and closes to allow access to the ingress gate;
   (b) locating an operator pit intermediate the holding gate and the rear of the milking stall; and (c) locating a bridge intermediate the holding gate and the rear of the milking stall.

10. A method of presenting an animal to be milked, comprising:
(a) forwardly unloading the animal from a holding area through a holding gate;
(b) translating the animal across an operator pit;
(c) forwardly loading the animal into a milking stall through a milking stall ingress gate;
(d) forwardly unloading the animal from the milking stall through a milking stall exit gate; and
(e) forwardly loading the animal onto a bridge cart after forwardly unloading the animal from the holding gate.

11. A method of presenting an animal to be milked, comprising:
(a) forwardly unloading the animal from a holding area through a holding gate;
(b) translating the animal across an operator pit;
(c) forwardly loading the animal into a milking stall through a milking stall ingress gate;
(d) forwardly unloading the animal from the milking stall through a milking stall exit gate; and
e) forwardly unloading the animal from a bridge cart prior to forwardly loading the animal into the milking stall.

* * * * *